May 20, 1969 J. E. FULENWIDER 3,445,824

INFORMATION STORAGE MATRIX UTILIZING ELECTRETS

Filed Nov. 26, 1965

INVENTOR
JOHN E. FULENWIDER
BY
ATTY.

United States Patent Office 3,445,824
Patented May 20, 1969

3,445,824
INFORMATION STORAGE MATRIX UTILIZING ELECTRETS

John E. Fulenwider, Glenview, Ill., assignor to Automatic Electric Laboratories, Inc., Northlake, Ill., a corporation of Delaware Filed Nov. 26, 1965, Ser. No. 509,699
Int. Cl. G11b 9/02
U.S. Cl. 340—173 3 Claims

ABSTRACT OF THE DISCLOSURE

An information storage device including a matrix array of row and column conductors disposed on opposite sides of a sheet of dielectric material, the dielectric material in the local regions of crossovers of the conductors defining bit locations in which information is stored by the presence or absence of an induced change in the dielectric material thereat. In one embodiment the induced change is a permanent electric polarization of the dielectric material at the bit location (i.e., an electret), and in another embodiment the induced change is a reduced thickness of the dielectric material at the bit location.

This invention relates to arrangements for storing binary information and more particularly to an arrangement using capacitors as storage elements.

With the expanding use of modern electronic computers and information handling systems, it has become increasingly important to provide simple, rapid and economical apparatus for storing information. One of the most desirable features of any such apparatus is permanency of information storage with ease and economy of changing the information stored. Various changeable card capacitor memories are known in the prior art. These provide relative ease in changing the stored information, but it becomes expensive to provide different cards for each set of information and to disassemble the apparatus to change the card.

It is the object of this invention to provide an improved arrangement for the storage of binary information.

It is a further object of this invention to provide an improved arrangement for permanently storing information which may be readily changed if it is desired to substitute different information.

This invention features the storing of information in a matrix array of row and column conductors which may be printed on opposite sides of a sheet of dielectric material. Each crossover between row and column conductors, together with the local region of dielectric material between the conductors at the crossover, defines a bit location. According to this invention, information is stored at each bit location in the form of the presence or absence of an induced change in the dielectric material thereat. In one embodiment, the induced change is an electret, i.e., a permanent electric polarization of the dielectric material at the bit location. In a second embodiment, the induced change is a reduced thickness of the dielectric material at the bit location. The presence of the induced change may be considered a binary "1" state, and the absence thereof, a binary "0" state.

A binary "1" is written into a particular bit location by first heating up the dielectric material at the bit location and then applying an electric potential difference between the row and column conductors thereat, while the dielectric material is hardening, to form a permanent polarization, or electret, in one case, or to produce a reduced thickness of dielectric due to the squeezing pressure of the attracted conductors, in the other case. Binary "0," of course, exists at locations where no change is induced.

Writing in of information can best be done one row or column at a time, and the matrix array is most suitable for use as a word oriented memory. The bit locations associated with a particular row would contain the individual binary states which make up the word stored in that row. Read out of the information stored in the matrix can then be accomplished one row, or word, at a time. A voltage pulse applied to a particular row conductor will be coupled to each of the column conductors with a magnitude dependent upon the state of the dielectric at the particular bit location associated with the particular column conductor. In the first embodiment, a pulse of greater magnitude will appear on column conductors which have an electret at the associated bit location than on column conductors which have no electret at the associated bit location. The greater magnitude of the pulse coupled through the capacitor at a bit location containing an electret results from the addition of a capacitively coupled voltage pulse and a coincident voltage pulse due to the permanent electric polarization. In the second embodiment, a pulse of greater magnitude will appear on column conductors which have a reduced dielectric thickness at the associated bit location than on column conductors which have no reduced dielectric thickness at the associated bit location. This results from the increase in capacitance at locations with reduced dielectric thickness. The binary information can then be utilized by discriminating the heights of the voltage pulses on the column conductors and indicating a binary "1" for the pulses of greater magnitude and a binary "0" for the pulses of lesser magnitude.

In the first embodiment, the stored information can be erased by heating the dielectric, thereby destroying the electrets. In the second embodiment, heating coupled with repelling potentials supplied to row and column conductors will erase the information by eliminating dielectric thickness differences. Once the old information has been erased, new information can be written in, in the manner described above.

The electret phenomenon has been adequately described in other references, so further explanation is not necessary here. See for example, Johnson, Electrets, a State of the Art Survey, AD 299259, available from the Office of Technical Services, U.S. Department of Commerce, Washington, D.C. It is to be understood that the two induced changes described above could be combined in the same information storage arrangement to provide greater clarity of information storage.

Thus it is the primary feature of this invention that information may be stored in a matrix by specifying the location of electrets or decreased dielectric thicknesses at capacitive couplings between pairs of orthogonal conductors.

It is another important feature of this invention that the contents of the matrix may readily be altered without disassembling the device.

Other objects and features and a complete understanding of this invention will be gained from a consideration of the following description with reference to the accompanying drawing, in which.

Figure 1:
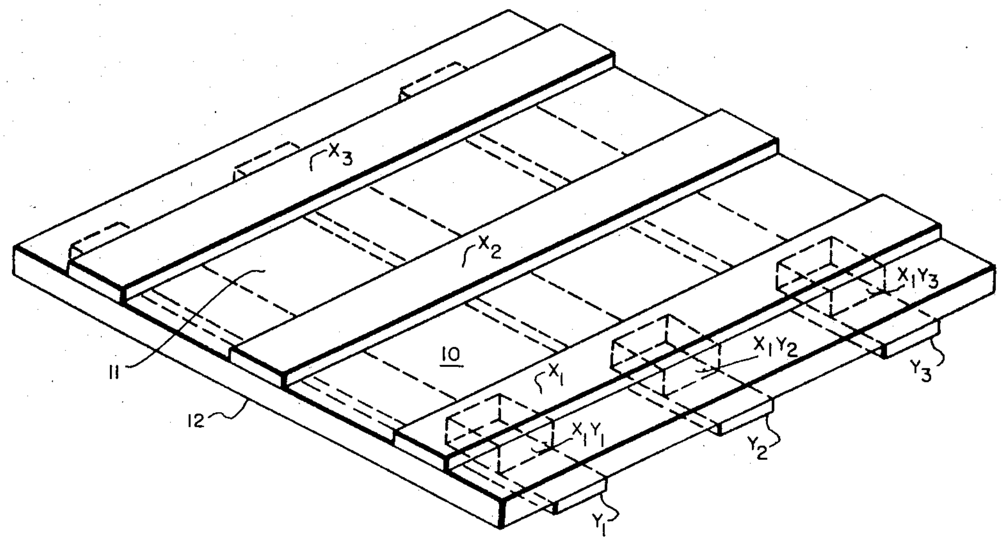
FIG. 1 is an isometric view of the structure of the capacitor matrix memory according to the invention.

FIG. 1 shows the structure of the capacitor matrix memory. A three-by-three matrix capable of storing nine bits is shown by way of example only. The matrix consists essentially of a sheet of dielectric material 10 with with row conductors $X_1$, $X_2$, and $X_3$ on one side 11 of the sheet 10 and column conductors $Y_1$, $Y_2$ and $Y_3$ on the other side 12 of the sheet 10. These arrays of row and column conductors are orthogonal to each other and may advantageously be printed on the dielectric material by well known printed circuit techniques. At the crossovers of the row and column conductors there will be capacitive couping through the dielectric sheet 10. Each of these crossovers together with the region of dielectric material between them constitutes a bit location. The bit locations $X_1Y_1$, $X_1Y_2$ and $X_1$, $Y_3$ are indentified in FIG. 1 by the region of dielectric material at the crossovers of row conductor $X_1$ with column conductors $Y_1$, $Y_2$, and $Y_3$.

Information is written into the matrix of capacitors in the form of the presence or absence of an induced change in the region of dielectric material located between crossovers of the row and column conductors. This induced change is either an electret or a reduced thickness in the region of dielectric material. The details concerning the writing in of binary information will be discussed with reference to FIGS. 2 and 3.

Figure 2:
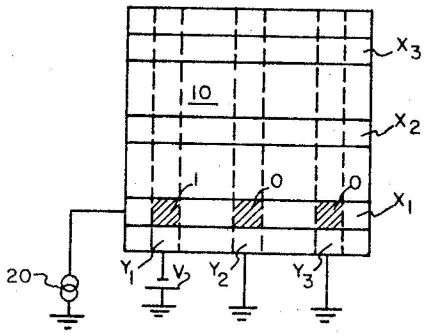
FIG. 2 shows schematically one way in which information could be written into the matrix in the form of electrets at bit locations.

FIG. 2 shows one scheme for writing in information in the form of the presence or absence of electrets at particular bit locations. As shown, the information is written in one row at a time. FIG. 2 shows a generator 20 connected to row conductor $X_1$. This generator supplies a radio frequency signal to row conductor $X_1$ which is capacitively coupled through the dielectric material 10 at crossovers $X_1Y_1$, $X_1Y_2$, $X_1Y_3$. The local losses in the dielectric material 10 at these crossovers as a result of the passage of the radio frequency signal through it produce heat to soften the dielectric material. At $X_1Y_1$ the direct current voltage source V establishes a potential difference between the row conductor $X_1$ and the column conductor $Y_1$. The dielectric material 10 in this case is one in which electrets may be induced. After the dielectric material has been softened, the radio frequency generator is disconnected from row conductor $X_1$, but the potential drop created by the voltage source V is maintained until the dielectric material hardens. This results in a permanent electric polarization, or electret, in the dielectric material at $X_1Y_1$. No electret will be formed at $X_1Y_2$ or at $X_1Y_3$ because no potential drop existed at those locations while the dielectric was hardening. The presence of an electret at $X_1Y_1$ gives that bit location a binary "1" designation, and the absence of an electret at $X_1Y_2$ and $X_1Y_3$ gives those bit locations a binary "0" designation. Other rows of the matrix would be coded in the same manner.

Figure 3:
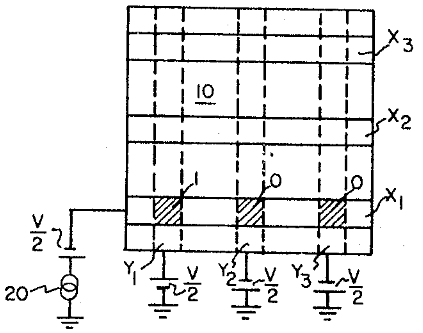
FIG. 3 shows schematically one way in which information could be written into the matrix in the form of reduced dielectric thicknesses at bit locations.

FIG. 3 shows a very similar scheme for writing in binary information in the form of the presence or absence of a reduced dielectric thickness at particular bit locations. A binary "1" is written in by providing attracting, opposite potentials to row and column conductors at the crossover associated with a particular bit location—$X_1Y_1$ in the example shown. These potentials are applied while the dielectric material at the bit location is hardening, and the attractive force between the conductors creates a pressure on the softened dielectric material and causes a reduction in the thickness thereof. Opposing potentials applied at $X_1Y_2$ and $X_1Y_3$ preclude any squeezing effect on the dielectric at those locations so binary "0" is written into those locations.

It is to be understood that other schemes could be used to heat the dielectric material at selected bit locations. For example, a heated platten could be placed in contact with the row or column conductors at the crossovers to heat the dielectric locally.

Figure 4:
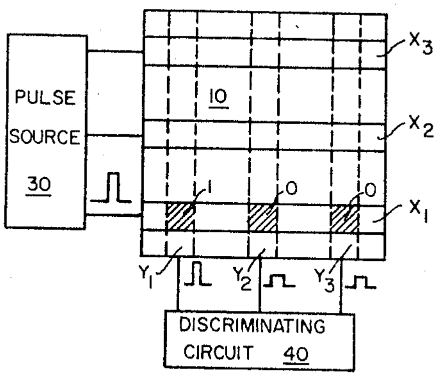
FIG. 4 shows schematically a read out arrangement for the matrices of FIGS. 2 and 3.

FIG. 4 shows a possible read-out arrangement for the pre-coded matrix. Pulse source 30 supplies a voltage pulse to a predetermined one of the row conductors—$X_1$ in the example shown. This voltage pulse is capacitively coupled to each of the column conductors $Y_1$, $Y_2$, and $Y_3$. From this example it is easily understood that the capacitor matrix memory is particularly well suited to word-oriented memories since the addresses $X_1Y_1$, $X_1Y_2$, and $X_1Y_3$ are addressed simultaneously. Pulses of different magnitude appear on the column conductors because of the presence of an induced change in the dielectric at the $X_1Y_1$ crossover. There is a higher pulse magnitude on conductor $Y_1$ due to the presence of the electret or of the reduced dielectric thickness at the $X_1Y_1$ location. The reasons for this were explained previously. The discriminating circuit 40 need only discriminate between the higher and lower pulse magnitudes to sense the contents of that row or word of the memory. Circuitry to perform this discrimination is known in the art. In the example shown the word 100 is indicated by a higher magnitude pulse on $Y_1$ and lower magnitude pulses on $Y_2$ and $Y_3$. Read out of information stored in other rows would be accomplished in a similar fashion.

If it is desired to change the information stored in the capacitor matrix memory, this can be readily done by erasing the old information and writing in new information. Erasure can be accomplished when electrets are employed by merely reheating the dielectric material to destroy the electret. When reduced dielectric thicknesses are employed heating of the dielectric and then cooling it with opposing potentials applied to row and column conductors to return the dielectric at bit locations to a uniform thickness will erase the stored information. New information could be written in, in the manner previously described.

It is to be understood that a combination of the arrangements described above could be utilized to provide increased clarity of information storage. In addition, it is to be understood that numerous modifications could be made in the particular embodiments described above without departing from the scope of this invention as claimed.

What is claimed is:

1. Apparatus for storing binary coded information comprising, a sheet of dielectric material of a type in which electrets may be induced, a matrix of row and column conductors arranged in orthogonal relationship and placed adjacent opposite surfaces of said sheet of dielectric material, each of said conductor crossovers and the portion of said dielectric material therebetween together defining a bit location, said information being stored in said matrix as the presence or absence of an induced electret in said portion of said dielectric material at each bit location.

2. Apparatus in accordance with claim 1 further including means for writing said information into said matrix, said writing means including heating means for temporarily softening said dielectric material at predetermined bit locations, and means for maintaining a potential difference between crossovers of said row and column conductors at said predetermined bit locations to form electrets in said dielectric material thereat.

3. Apparatus in accordance with claim 2 wherein said means for heating comprises a source of radio frequency energy coupled between said row and column conductors at predetermined bit locations, the energy losses in said dielectric material at said predetermined bit locations generating sufficent heat to soften said dielectric material thereat.

References Cited

UNITED STATES PATENTS

| | | | |
|---|---|---|---|
| 3,072,742 | 1/1963 | Block | 340—173 |
| 3,158,430 | 1/1964 | McNaney | 340—173 |
| 3,174,134 | 3/1965 | Steinbuch et al. | 340—173 X |
| 3,199,086 | 8/1965 | Kallmann et al. | 340—173 X |

BERNARD KONICK, *Primary Examiner.*

J. F. BREIMAYER, *Assistant Examiner.*

U.S. Cl. X.R.

307—88; 340—173.2